United States Patent
Kuisma et al.

(10) Patent No.: US 9,829,405 B2
(45) Date of Patent: Nov. 28, 2017

(54) MICROMECHANICAL PRESSURE SENSOR STRUCTURE HAVING A SIDE WALL LAYER

(71) Applicant: MURATA MANUFACTURING CO., LTD., Nagaokakyo, Kyoto (JP)

(72) Inventors: Heikki Kuisma, Helsinki (FI); Koichi Yoshida, Nagaokakyo (JP)

(73) Assignee: MURATA MANUFACTURING CO., LTD., Nagaokakyo-shi, Kyoto (JP)

( * ) Notice: Subject to any disclaimer, the term of this patent is extended or adjusted under 35 U.S.C. 154(b) by 303 days.

(21) Appl. No.: 14/600,240

(22) Filed: Jan. 20, 2015

(65) Prior Publication Data

US 2015/0204744 A1  Jul. 23, 2015

(30) Foreign Application Priority Data

Jan. 17, 2014  (FI) ..................................... 20145044

(51) Int. Cl.
    *G01L 9/00* (2006.01)

(52) U.S. Cl.
    CPC .......... *G01L 9/0072* (2013.01); *G01L 9/0041* (2013.01)

(58) Field of Classification Search
    None
    See application file for complete search history.

(56) References Cited

U.S. PATENT DOCUMENTS

| 8,334,159 | B1 | 12/2012 | Fu |
| 2005/0076719 | A1 | 4/2005 | Jakobsen et al. |
| 2005/0262947 | A1 | 12/2005 | Dehe |
| 2015/0198493 | A1* | 7/2015 | Kaelberer ............ G01P 15/0802 73/718 |

FOREIGN PATENT DOCUMENTS

| DE | 37 37 059 A1 | 5/1989 |
| EP | 0 376 632 A1 | 7/1990 |
| EP | 0 380 885 A1 | 8/1990 |
| EP | 2 520 917 A1 | 11/2012 |
| JP | 2001-255225 A | 9/2001 |
| JP | 2007-057247 A | 3/2007 |
| JP | 2007-278716 A | 10/2007 |

OTHER PUBLICATIONS

International Search Report dated May 7, 2015 corresponding to International Patent Application No. PCT/IB2015/050241.
Finnish Search Report dated Aug. 22, 2014 corresponding to Finnish Patent Application No. 20145044.
Finnish Search Report Patent Application No. 20145044 dated Feb. 28, 2017.

* cited by examiner

*Primary Examiner* — Peter Macchiarolo
*Assistant Examiner* — Jermaine Jenkins
(74) *Attorney, Agent, or Firm* — Squire Patton Boggs (US) LLP

(57) ABSTRACT

A microelectromechanical pressure sensor structure that comprises a planar base, a side wall layer and a diaphragm plate. The side wall layer forms side walls that extend away from the planar base into contact with the diaphragm plate. The side wall layer is formed of at least three layers, a first layer and a second layer of insulating material and a third layer of conductive material, wherein the third layer is between the first layer and the second layer. The conducting layer provides a shield electrode within the isolating side wall layer. This shield electrode is adapted to reduce undesired effects to the capacitive measurement results.

17 Claims, 9 Drawing Sheets

MICROMECHANICAL PRESSURE SENSOR STRUCTURE HAVING A SIDE WALL LAYER

BACKGROUND

Field

The present invention relates to microelectromechanical devices and especially to an improved pressure sensor structure and a pressure sensor according to preambles of the independent claims.

Description of the Related Art

Pressure is a physical quantity that corresponds to the ratio of force acting on a surface to the area of the surface. A device that can be used as a gauge to measure the pressure is a pressure sensor.

Micro-Electro-Mechanical Systems, or MEMS can be defined as miniaturized mechanical and electro-mechanical systems where at least some elements have some sort of mechanical functionality. Since MEMS devices are created with the same tools used to create integrated circuits, micromachines and microelectronic elements can be fabricated on a piece of silicon to enable various types of devices.

FIG. 1 illustrates an exemplary structure of a microelectromechanical device for sensing of pressure. Microelectromechanical pressure sensors may comprise a thin diaphragm 10 that is spanned over a gap 12 that contains volatile material at a reference pressure. The diaphragm deforms due to difference between the reference pressure and an ambient pressure surrounding the sensor. The diaphragm displacement may be translated to an electrical signal with capacitive or piezoresistive sensing.

A MEMS pressure sensor structure is typically formed of patterned layers of materials. A MEMS fabrication process may involve combinations of layer depositions, optical lithography, etches and wafer bonding. FIG. 1 shows a side view and a top view of the exemplary structure of a microelectromechanical pressure sensor. The exemplary pressure sensor is an absolute pressure sensor that comprises a body structure formed by a planar base 11 and a side wall layer 13. The side walls formed by the side wall layer 13 extend away from the planar base 11 to form a hollow, the depth of which corresponds with the thickness of the side wall layer 13. In this particular category of pressure sensor structures, the hollow is hermetically sealed by a diaphragm plate 16 that extends on the side wall layer 13. A part of the diaphragm plate 16 that extends over the circumferential opening of the gap provides a diaphragm 10 whose periphery is defined by the opening. The diaphragm 10 is exposed on one side to the reference pressure of the gap and on the other side to the ambient pressure. This diaphragm 10 thus deforms in response to a pressure difference between the reference pressure and the ambient pressure. The extent of this deformation may be detected, for example, capacitively by arranging electrodes to elements on either sides of the gap and translating with the electrodes the deformation-induced change in the height of the gap into an electric signal.

A disadvantage of the sensor of FIG. 1 is that it provides a parallel capacitance over the side wall 13. The additional parallel capacitance tends to decrease the relative sensitivity, impair the linearity of the 1/C-function and increase the temperature dependence of the sensor. The structure provides also a path for leakage current and stray capacitance over the outer edge of the side wall 13. This outer edge is located on the exterior surface of the sensor and may be affected by external conditions such as mounting and protection materials, humidity and chemical contamination. These effects may bring a variable part to the total capacitance between the diaphragm plate 16 and the planar base 11, and thereby cause an error when the pressure reading of the sensor is determined.

SUMMARY

An object of the present invention is to provide a pressure sensor structure that that enables elimination or alleviation of at least one of the above disadvantages. This objective is achieved with a pressure sensor structure and a pressure sensor according to the characterizing portions of the independent claims. Some preferred embodiments of the invention are disclosed in the dependent claims.

Certain embodiments of the invention define a microelectromechanical pressure sensor structure that comprises a planar base, a side wall layer and a diaphragm plate. The side wall layer forms side walls that extend away from the planar base into contact with the diaphragm plate. The side wall layer is formed of at least three layers, a first layer and a second layer of insulating material and a third layer of conductive material, wherein the third layer is between the first layer and the second layer.

The conducting element within the isolating side wall layer may be used as a shield electrode to significantly reduce undesired effects to the capacitive measurement results.

Features and advantages of the claimed invention and its embodiments are described in more detail with the detailed description of the embodiments.

BRIEF DESCRIPTION OF THE DRAWINGS

The invention will be described in greater detail, in connection with preferred embodiments, with reference to the attached drawings, in which.

DETAILED DESCRIPTION

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail. Various implementations of pressure sensors comprise elements that are generally known to a person skilled in the art and may not be specifically described herein.

Figure 1:
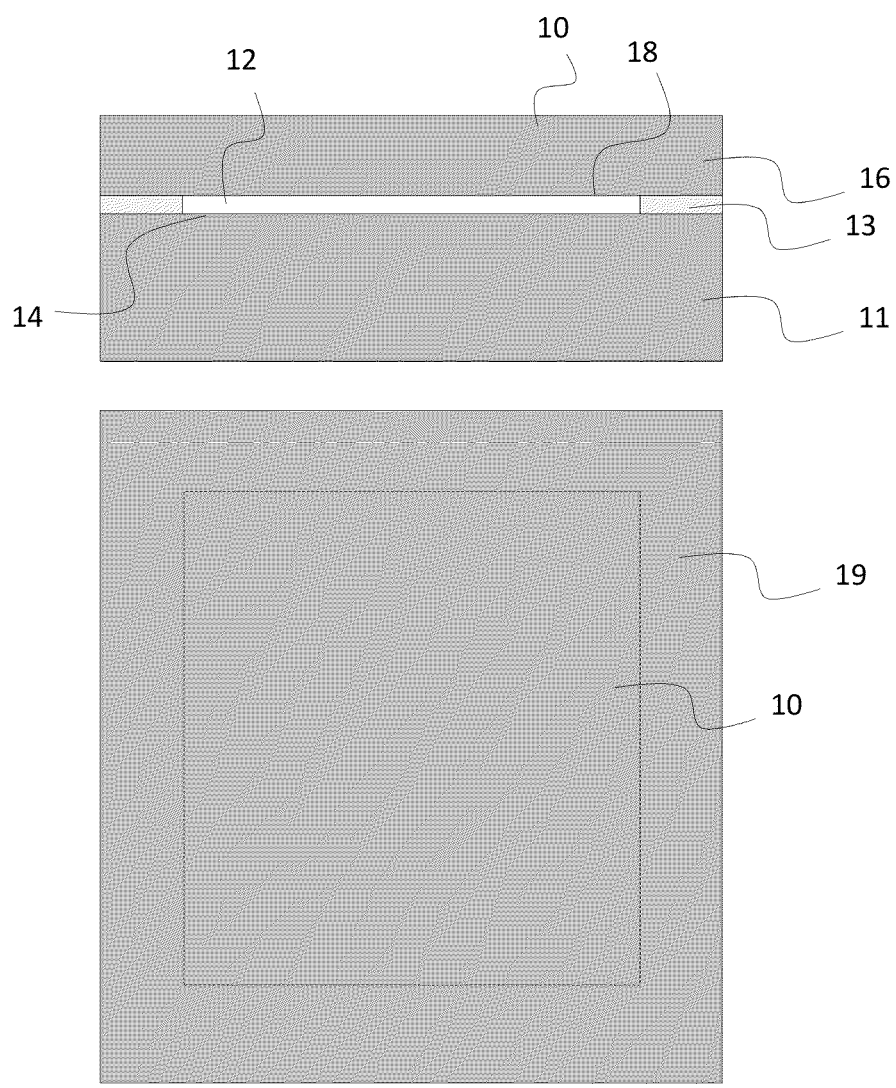
FIG. 1 shows a side view and a top view of an exemplary structure of a microelectromechanical pressure sensor.

Embodiments of the pressure sensor structure apply elements that are discussed in more detail with reference to FIG. 1. FIG. 1 illustrates the exemplary structure of a microelectromechanical pressure sensor, and shows a side view and a top view of the illustrated sensor structure. An absolute pressure sensor typically incorporates a gap that is hermetically closed from the ambient environment. In a differential pressure sensor, the diaphragm is exposed to two separate pressures. If the other pressure is the atmospheric pressure, the differential pressure sensor may be called an overpressure sensor. If the other pressure is another known reference pressure, the differential pressure sensor may be called a relational sensor. The invention may be applied to any type of absolute or differential pressure sensor structures that include the claimed configuration.

The exemplary pressure sensor structure of FIG. 1 is an absolute pressure sensor. The illustrated pressure sensor structure comprises a body structure formed by a planar base 11 and a side wall layer 13. The planar base 11 may be manufactured from a wafer of silicon material, but other conductor, semiconductor or insulator materials may be applied within the scope of protection. The planar base 11 may also comprise layers of material. As an example, a layer on the surface of the planar base may be electrically conductive to act as an electrode of a capacitive sensor. As another example, the entire planar base may have high enough conductivity to act as an electrode. The planar base 11 has a first surface 14 that extends essentially along a plane of the planar base 11. The term essentially means here that the first surface may accommodate minor surface structures (bumps or cavities), but over 90% of the surface area is, within tolerances, aligned to the plane of the planar base 11.

The side wall layer 13 is a non-continuous layer that provides side walls that extend away from the first surface 14, advantageously to a direction that is perpendicular to the first surface 14, as shown in FIG. 1. A surface of the side wall layer furthermost from the first surface 14 is a top surface of the side wall layer. A surface or surfaces of the side wall layer on the other side than the gap is an outer surface of the side wall layer. The side wall layer 13 is rigidly attached to the planar base 11 and thus circumscribes an open space onto it. Together with the planar base 11, the side walls of the side wall layer 13 form a hollow, the depth of which corresponds with the height of the side walls, and the thickness of the side wall layer 13. Typically the side wall layer is very thin, and thus the hollow is very low, in the order of micrometers, or even less than one micron. The conventional side wall layer may be of electrically insulating material, like silicon dioxide, but other electrically insulating materials may be applied. In the top view of the example structure, the top surface 19 of the side wall layer 13 is illustrated with a rectangular perimeter that extends outwards from the dotted line. The dotted line denotes the inner surfaces of the side walls, and top edge of these inner surfaces defines a circumferential opening of the hollow formed by the planar base 11 and the side wall layer 13.

This hollow is hermetically sealed by the diaphragm plate 16 that extends on the side wall layer 13. The term diaphragm refers here to a film of elastically deforming material that is anchored at its periphery. The diaphragm plate 16 is a planar object that provides to the sensor structure a diaphragm 10 and anchors the diaphragm at its periphery. The diaphragm plate 16 may be made of one or more material layers. Silicon material is often used at least in one layer of the diaphragm plate, but other conductor, semiconductor or insulator materials may be applied within the scope of protection. The diaphragm plate 16 connects to the side wall layer 13 through a second surface 18 that is a plane initially parallel to the first surface 14 of the planar base 11. It is noted that the term initially relates here to the dimensions of the elements in the manufacturing stages of the sensor. A person skilled in the art understands that during operation of the pressure sensor parts may deform out of their initial planar form.

In the structure of FIG. 1, the planar base 11, the side wall layer 13 and the diaphragm plate 16 are attached to each other such that the first surface 14, the second surface 18 and the inner surfaces of the side walls 13 form a hermetically closed gap 12 that contains volatile material at a reference pressure. The gap 12 may be evacuated to contain only small amounts of residual gases, but it can also be filled with a selected gas or other volatile material at a selected reference pressure.

A part of the diaphragm plate 16 that extends over the circumferential opening to the gap 12 provides the diaphragm 10 whose periphery is defined by the opening. The deformation of the diaphragm 10 may be detected capacitively, or alternatively with a piezoresistive or similar straingauge based method by translating deformation-induced stress in the diaphragm into an electrical signal with incorporated piezoresistors or strain-gauge resistors. All of these methods are disclosed in the art and as such well known to a person skilled in the art will not be discussed in more detail in this text.

A disadvantage of the sensor structure of FIG. 1 is that there tends to be a large constant capacitance associated with the side wall 13. Since the side wall 13 is located at the outer periphery of the diaphragm plate, its area is significant compared to the area of the bending diaphragm 10, which forms the pressure sensitive part of the sensor capacitor. Also the insulating material of the sidewall 13 has a significant relative dielectric constant (in case of silicon dioxide it is 4), which multiplies the capacitance associated with the side wall 13. This side wall capacitance is electrically in parallel with the sensor capacitance and will be added to it when evaluating the capacitance between the diaphragm plate 16 and the planar base 11. It effectively reduces the relative sensitivity (ratio of the capacitance change due to applied nominal full scale pressure to the capacitance at zero pressure) and renders the 1/C (inverse capacitance) characteristics very non-linear as a function of pressure.

In addition, the outer surfaces of the sensor structure are often exposed to ambient conditions that may cause resistive or capacitive leakage and other stray effects to the capacitive measurement results.

Figure 2A:
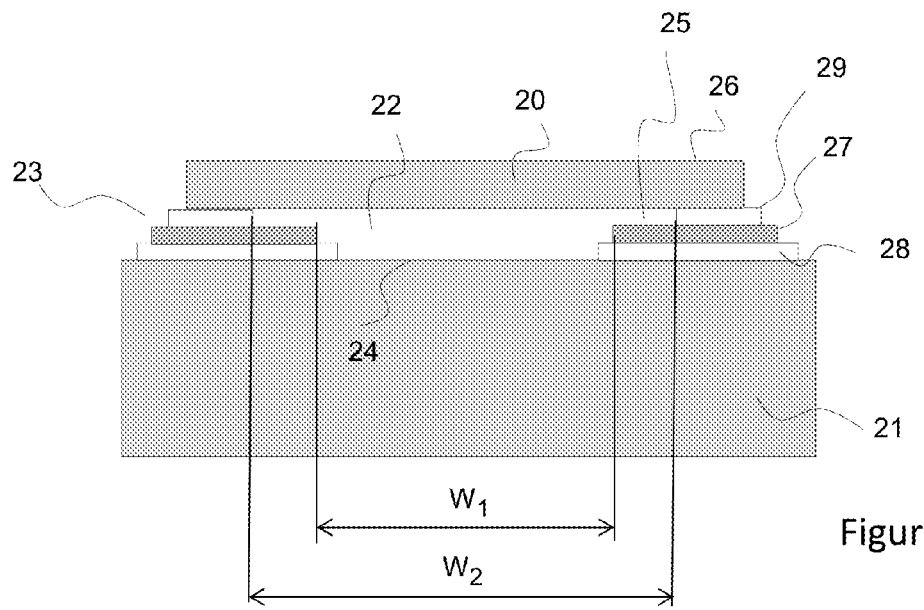
FIGS. 2A, 2B illustrate an exemplary embodiment of a microelectromechanical pressure sensor structure.
Figure 2B:
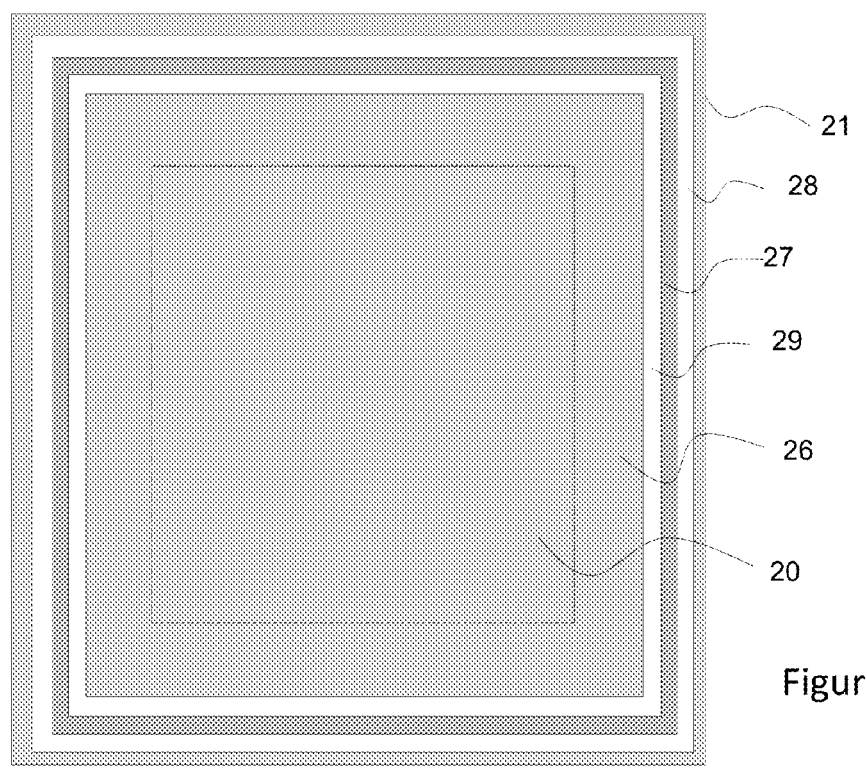

It has now been detected that these effects may be effectively reduced with a structure where the side wall layer comprises an integrated shield electrode. Accordingly, the side walls are formed of at least three layers, a first layer and a second layer of insulating material and a third layer of conductive material between them. The third layer provides the integrated shield electrode for the structure. FIGS. 2A, 2B illustrate an exemplary embodiment of such a structure. FIG. 2A illustrates a side view of the described structure and FIG. 2B illustrates a top view of the same.

The microelectromechanical pressure sensor structure of FIGS. 2A and 2B comprises a planar base 21 and a diaphragm plate 20, as described with FIG. 1. The exemplary absolute pressure sensor structure comprises also side walls 23 connected to the planar base 21 and the diaphragm plate 20 to form a hermetically closed gap 22 that contains volatile material at a reference pressure. It is noted that in a differential pressure sensor structure, the reference pressure may be led to the gap 22 through a channel within the planar base 21, for example. In the structure of FIG. 2, at least part of the diaphragm plate 20 deforms due to difference between the reference pressure and an ambient pressure surrounding the sensor structure. The displacement of the diaphragm plate 20 may be translated to an electrical signal with capacitive sensing. The capacitance is formed between a first surface 24 of the planar base 21 and the second surface 25 of the diaphragm plate 20. The side walls 23 also seal the gap 22 so that there is no fluidic transfer possible between the gap 22 and exterior of the sensor.

The side wall layer 23 is a mufti-layer structure that includes at least three layers where two layers 27, 28 are of electrically insulating material, preferably of silicon dioxide, and a layer 29 between them is of conductive material, preferably of polycrystalline silicon. One surface of the first layer 28 is connected to the first surface 24 on the planar base 21 and the other surface of the first layer is connected to the third layer 27. One surface of the second layer 29 is connected to the second surface 25 on the diaphragm plate and the other surface of the second layer is connected to the third layer 27. The insulating first layer 28, the third layer 27 providing a shield electrode, and the second layer 29 that form the side wall layer 23 are thus stacked on top of each other so that they at least partially overlap. The height of the gap 22 is determined by the sum of the thicknesses of the first layer 28, the second layer 29 and the third layer 27.

Due to the described mufti-layer structure of the side walls, an additional parallel capacitance associated to side walls 23 is now arranged to exist between the diaphragm plate 26 and the shield electrode provided by the third layer 27 and not between the diaphragm plate 26 and the planar base 21. As will be described, the effect of this additional capacitance to measured capacitance between the diaphragm plate 26 and the planar base 21 can be minimized with a capacitive converter circuit, and the detrimental effect of the side walls to the relative sensitivity and linearity thus practically eliminated.

In the structure, the first layer 28, the intermediate third layer 27, and the second layer 29 may be arranged and patterned so that the first insulating layer 28 extends horizontally beyond the third layer 27, and the third layer 27 extends horizontally beyond the second insulating layer 29. In other words, in a cross section of the sensor structure with a plane perpendicular to its structural layers (for example perpendicular to the plane of the first surface 24), the outer periphery of the first layer 28 is further away from the gap than the outer periphery of the third layer 27, and the outer periphery of the third layer is further away from the gap than the outer periphery of the second layer. Correspondingly, in the same cross section, the distance between opposite inner peripheries of the first layer 28 (i.e. the width of the gap) may be smaller than the distance $W_1$ between opposite inner peripheries of the third layer 27, and the distance $W_1$ between opposite inner peripheries of the third layer may be smaller than the distance $W_2$ between opposite inner peripheries of the second layer 29.

As shown in FIG. 2B, when viewed from top, periphery of the first insulating 28 layer is thus visible beyond the edge of the third layer 27, and periphery of the third layer 27 is visible beyond the edge of the second layer 29. Advantageously, the outer periphery of the second layer extends also beyond the diaphragm plate 26 so that periphery of the second layer 29 is visible beyond the edge of the diaphragm plate 26. If the side walls were viewed from top without the diaphragm plate, at all locations of both the inner and outer peripheries of the three layers 23, 27 and 28 part of the first layer 28 could be seen to extend beyond the outer edge of the third layer 27, and part of the third layer 27 to extend beyond the outer edge of the side wall layer 23. Accordingly, external leakage current and stray capacitance effects are minimized since there is practically no short and easy path for resistive or capacitive current to flow between the diaphragm plate 26 and the planar base 21. At all locations around the periphery of the sensor there is the shield layer 27 lengthening and interrupting this path.

In the above structure, stray and parallel capacitance can be eliminated or at least significantly reduced by means of a capacitive converter circuit with a closed loop operational amplifier. In the arrangement, the measured capacitance results from the capacitance between the planar base 21 and the diaphragm plate 26 over the area without (in the top view not covered by) the shield electrode created by the third layer 27. The influences of capacitances between the planar base 21 and the shield electrode 27, between the diaphragm plate 26 and the shield electrode 27, as well as stray capacitances and leakage resistances over the edge 23 can be effectively eliminated. If, in the sensor structure of FIG. 2, an operational amplifier circuit is arranged to keep the shield electrode 27 in the same potential as the electrode of either of the diaphragm plate 20 or the planar base 21, the voltage output of the operational amplifier can be made to be essentially indicative of the capacitance between the central portion of the diaphragm plate and the planar base only. The effects of parallel capacitances and possible leakage currents over the insulating surfaces from the diaphragm plate to the shield electrode 27 and from the shield electrode 27 to the planar base 21 may thus be reduced by the factor of the open loop gain of the operational amplifier.

For proper operation of the sensor, the shield electrode 27 may be connected either to a constant electrical potential, preferably to the ground or virtual ground of the electrical circuit connected to the sensor or to any other potential that allows to separate currents flowing between the diaphragm plate 26 and the shield electrode 27 and between the planar base 21 and the shield electrode 27 from a current flowing between the diaphragm plate 26 and the planar base 21. In other words, the electrical impedances between the diaphragm plate 26 and the third layer 27, and between the planar base 21 and the third layer 27 may be adapted not to affect the measured capacitance between the diaphragm plate 26 and the planar base 21.

FIGS. 3A to 3F illustrate exemplary capacitive converter circuit configurations suitable for reducing the undesired effects in the sensor structure. The configurations include an operational amplifier 30, a terminal input 31 for the planar base electrode, a terminal input 36 for the diaphragm plate electrode, a terminal input 32 to the shield electrode, a voltage source 34 or a current source 35, and reference impedance 37. These components are connected to obtain a voltage output indicative of the capacitance between the diaphragm plate and the planar base without noticeable influence from parallel capacitance over the side wall layers and from the changes in the surface conductivity of the insulating layer due to varying humidity. It is, however, clear to a person skilled in the art that further variations of the operational amplifier circuit configurations that apply operational amplification in the claimed manner may be applied without deviating from the scope of protection.

FIGS. 3A to 3D show exemplary inverting operational amplifier circuits where the positive non-inverting input is connected to a common ground or zero voltage terminal. Because of the nearly zero differential input voltage requirement of the closed loop feedback circuit, the voltage potential at the inverting input is nearly equal to that at the non-inverting input, and produces a virtual ground summing point 38.

Figure 3A:
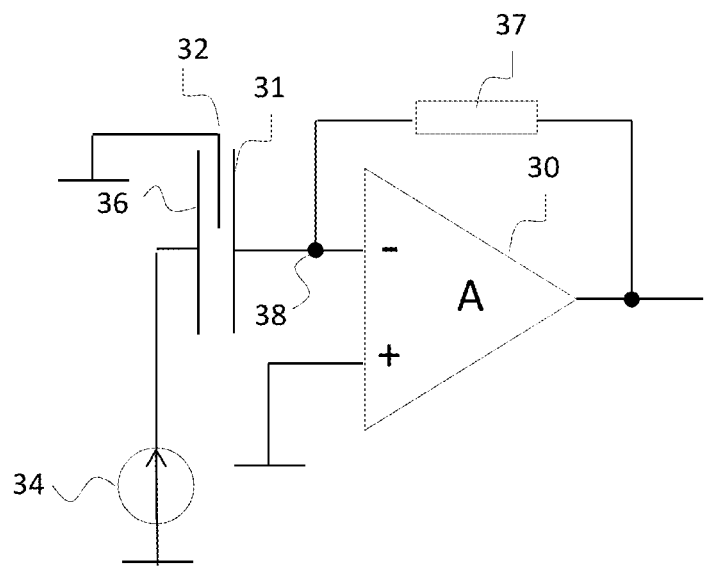
FIGS. 3A to 3F illustrate exemplary capacitive converter circuit configurations.

In FIG. 3A the shield electrode is arranged to the same potential as the planar base. As shown in FIG. 3A, a planar base terminal 31 connects to the virtual ground potential at the inverting input of the amplifier and a shield electrode terminal 32 is at ground potential. Due to this, the voltage and current between the shield electrode and the planar base are negligible and have practically no effect to the capacity values measured between the planar base and the diaphragm plate. A diaphragm plate terminal 36 is connected to a voltage source 34 so that the current between the shield electrode and the diaphragm plate is negligible and has practically no effect to the capacity values measured between the diaphragm plate and the planar base. The capacitance between the shield electrode and the planar base is connected between the ground and the virtual ground 38 and has practically no effect to the capacity values measured between the diaphragm plate and the planar base.

As a further background, let us denote the capacitance between the planar base terminal 31 and the diaphragm plate terminal 36 by $C_S$ and the capacitance between the planar base terminal 31 and the shield electrode terminal 32 by $C_L$. Let us also assume that the voltage source 34 is an AC voltage source with effective voltage Ui and that the feedback circuit element 37 is a capacitor with capacitance equal to $C_F$ and that the open loop gain of the amplifier is A. The output voltage Uo of the amplifier can be written as $$U_O = \frac{C_S}{C_L/A + C_F} U_i \quad (1)$$

The effect of $C_L$ is thus reduced by the amount of the amplifier open loop gain. The capacitance between the diaphragm plate terminal 36 and the shield electrode terminal 32 also has no effect on the output voltage since it is connected in parallel with the voltage source Ui that as an ideal voltage source can supply the current to this capacitance without a change in the voltage.

Figure 3B:
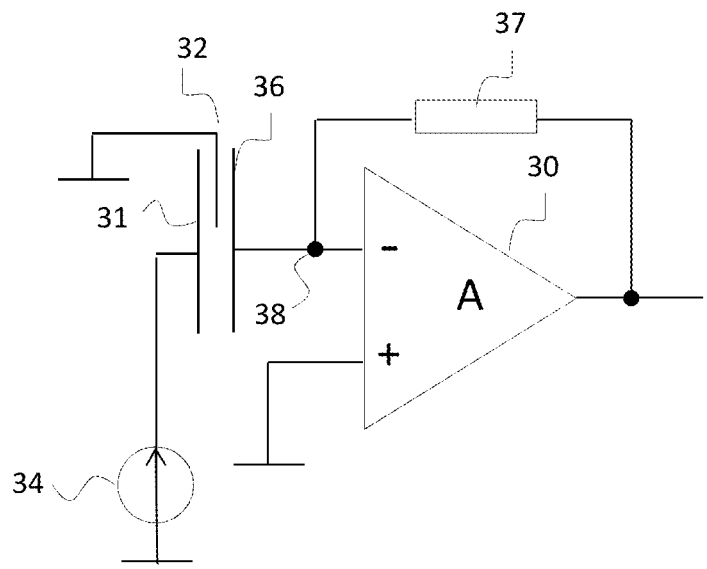

In FIG. 3B the shield electrode is arranged to nearly the same potential as the diaphragm plate. As shown in FIG. 3B, the diaphragm plate terminal 36 connects to the virtual ground potential at the inverting input of the amplifier and the shield electrode terminal 32 is at ground potential. Due to this, the voltage and current between the shield electrode and the diaphragm plate are negligible and have practically no effect to the capacity values measured between the planar base and the diaphragm plate. The planar base terminal 31 is connected to the voltage source 34 so that the current between the shield electrode and the planar base has practically no effect to the capacity values measured between the diaphragm plate and the planar base. The capacitance between the shield electrode and the planar base is connected between the ground and the voltage source, and has therefore practically no effect to the capacity values measured between the diaphragm plate and the planar base.

Figure 3C:
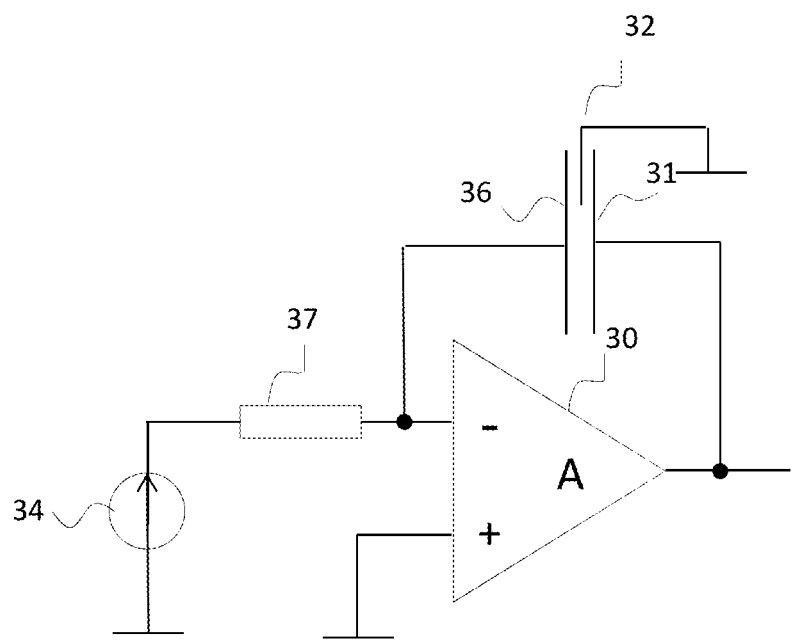

In FIG. 3C the shield electrode is also arranged to nearly the same potential as the diaphragm plate. As shown in FIG. 3C, the diaphragm plate terminal 36 connects to the virtual ground potential at the inverting input of the amplifier and the shield electrode terminal 32 is at ground potential. Due to this, the voltage and current between the shield electrode and the diaphragm plate are negligible and have practically no effect to the capacity values measured between the planar base and the diaphragm plate. The planar base terminal 31 is connected to the output of the amplifier 30 so that the current between the shield electrode and the planar base is negligible and has practically no effect to the capacity values measured between the diaphragm plate and the planar base. The capacitance between the shield electrode and the planar base is connected between the ground and the output of the amplifier 30, and has therefore practically no effect to the capacity values measured between the diaphragm plate and the planar base.

Figure 3D:
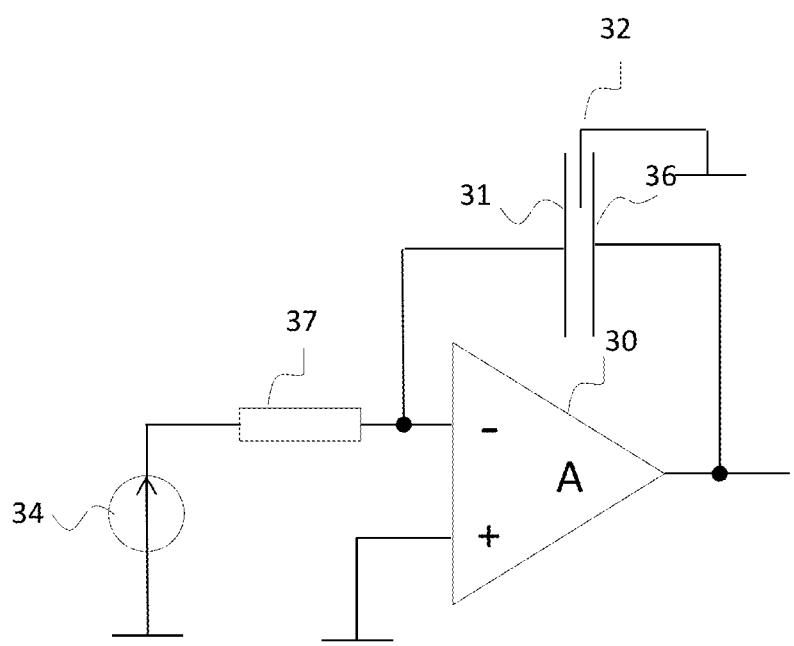

In FIG. 3D the shield electrode is again arranged to nearly the same potential as the planar base. As shown in FIG. 3D, the planar base terminal 31 connects to the virtual ground potential at the inverting input of the amplifier and the shield electrode terminal 32 is at ground potential. Due to this, the voltage and current between the shield electrode and the planar base are negligible and have practically no effect to the capacity values measured between the planar base and the diaphragm plate. The diaphragm plate terminal 36 is connected to the output of the amplifier 30 so that the current between the shield electrode and the diaphragm plate is negligible and has practically no effect to the capacity values measured between the diaphragm plate and the planar base. The capacitance between the shield electrode and the planar base is connected between the ground and the virtual ground 68 and has therefore practically no effect to the capacity values measured between the diaphragm plate and the planar base.

In FIGS. 3A to 3D the shield electrode terminal is connected to the ground potential. Terminals of the planar base or the diaphragm plate provide the sensed capacitance, and one of the sensor terminals is connected to the virtual ground of the amplifier circuit. This enables to keep the shield electrode terminal and one of the sensor terminals at nearly the same voltage while isolating the currents through the shield and the diaphragm plate terminals from each other. It is within the invention to use many variations of this principle other than those shown in FIGS. 3A to 3D.

Figure 3E:
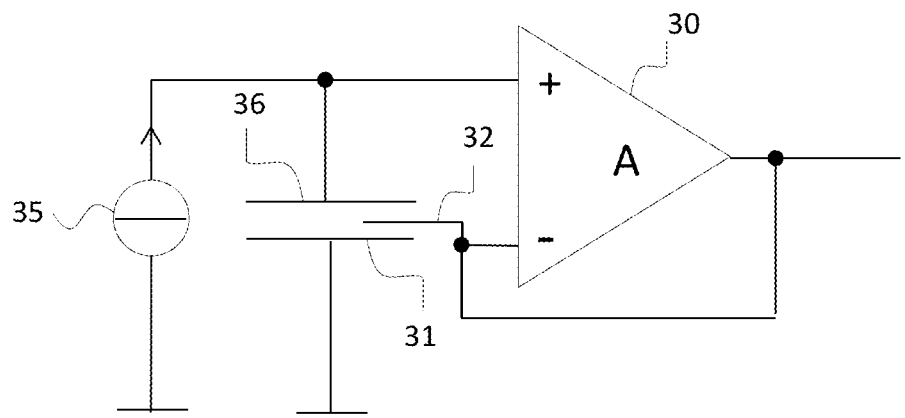
Figure 3F:
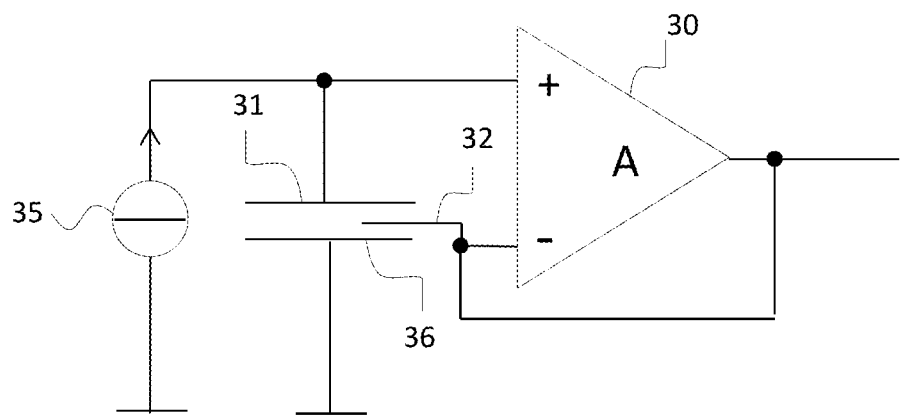

FIGS. 3E and 3F show exemplary non-inverting operational amplifier circuits. The operational amplifier 30 is used as a voltage follower where the output of the operational amplifier is connected directly back to the inverting input. The voltage potential at the inverting input is nearly equal to that at the non-inverting input.

In FIG. 3E the shield electrode is arranged to nearly the same potential as the diaphragm plate. As shown in FIG. 3E, the diaphragm plate terminal 36 is connected to a current source 35 with a predefined or otherwise known current. It is understood that the current source 35 may be also formed of a combination of current and voltage sources with internal impedances and where the current is not constant but it is known by being measured with e.g. a shunt resistor or other known current measurement technique. Since the diaphragm plate and the shield electrode are now in nearly the same potential, practically no current flows between them. Potential leakage or capacitive current between the shield electrode and the planar base has also practically no effect to the voltage or current between the diaphragm plate or the planar base since this current is provided by the amplifier without practically affecting the output voltage.

As a further background, let us denote the capacitance between the planar base terminal 31 and the diaphragm plate terminal 36 by $C_S$ and the capacitance between the inverting (−) and non-inverting (+) inputs of the amplifier by $C_i$. This capacitance includes both the input capacitance of the amplifier and the capacitance between the diaphragm plate terminal 36 and the shield electrode terminal 32. Let's also assume that the current source 35 is an AC source with effective current $J_i$ at frequency f and that the open loop gain of the amplifier is A. The output voltage $U_o$ of the amplifier can be written as $$U_O = \frac{1}{1 + \frac{C_i + C_S}{AC_S}} \frac{J_i}{2\pi f C_S} \quad (2)$$

The effect of $C_i$ is thus reduced by the amount of the amplifier open loop gain A. The capacitance between the planar base terminal 31 and the shield electrode terminal 32 also has no effect on the output voltage since it is connected between the output terminal of the amplifier and ground terminal and has thus almost no effect on the output voltage.

In FIG. 3F the shield electrode is arranged to nearly the same potential as the planar base. As shown in FIG. 3F, the planar base terminal 31 is connected to the current source 35 with the predefined or otherwise known current. Since the planar base and the shield electrode are now in nearly the same potential, practically no current flows between them. Potential leakage or capacitive current between the shield electrode and the diaphragm plate has practically no effect to the voltage or current between the diaphragm plate and the planar base since this current is provided by the amplifier without practically affecting the output voltage.

In FIGS. 3E and 3F the shield electrode terminal is connected to the output of an amplifier, which is arranged to closely follow the potential of one of the sensor terminals thus keeping the current between the shield electrode terminal and the one sensor terminal negligible. It is within the invention to use variations of this principle other than given in FIGS. 3E and 3F.

All the examples of FIGS. 3A through 3F use an amplifier in a feed-back configuration to keep the potential of the shield electrode terminal close to the potential of one of the sensor terminals while at the same time keeping the current paths through the guard and the diaphragm plate terminals separated.

Figure 4:
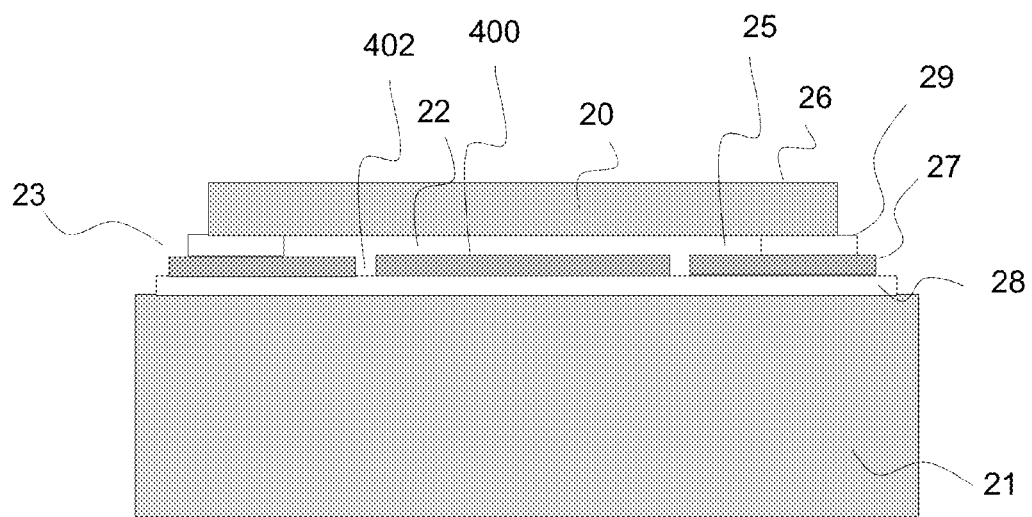
FIG. 4 illustrates another embodiment of a microelectromechanical pressure sensor structure.

In the sensor structure of FIGS. 2A and 2B, the height of the gap 22 is determined by the sum of the thicknesses of the first layer 28, the second layer 29 and the third layer 27. This may lead to impractically small layer thicknesses in applications where the gap height needs to be very small, e.g. in the order of one micron or below. FIG. 4 illustrates a side view of a further embodiment that is more suitable for such applications. The top view of the structure corresponds with the top view shown in FIG. 2B. In this embodiment, the first layer 28 extends over the first surface of the planar base 21 and carries an internal electrode layer 400 on top of it. The internal electrode layer 400 extends on the insulating first layer 28 circumscribed by the shield electrode of the third layer 27. The internal electrode layer advantageously extends to fill almost the entire area within the shield electrode but is electrically isolated from the shield electrode of the third layer 27, for example by a narrow trench 402.

The extent of the internal electrode layer may be arranged so that in a cross section through structure layers, the width of the internal electrode layer 400 and of the third layer 27 on the first layer is a multiple (at least ten times) of the width of an electrically isolating region, like the trench 402. Due to the internal electrode layer, the dielectric gap is effectively formed between opposite surfaces of the internal electrode layer 400 and the diaphragm plate 20. Accordingly, the capacitance of the sensor is thus determined by the thickness of the second layer 29 only, no longer by the thickness of the first and third layers 28, 27.

Figure 5:
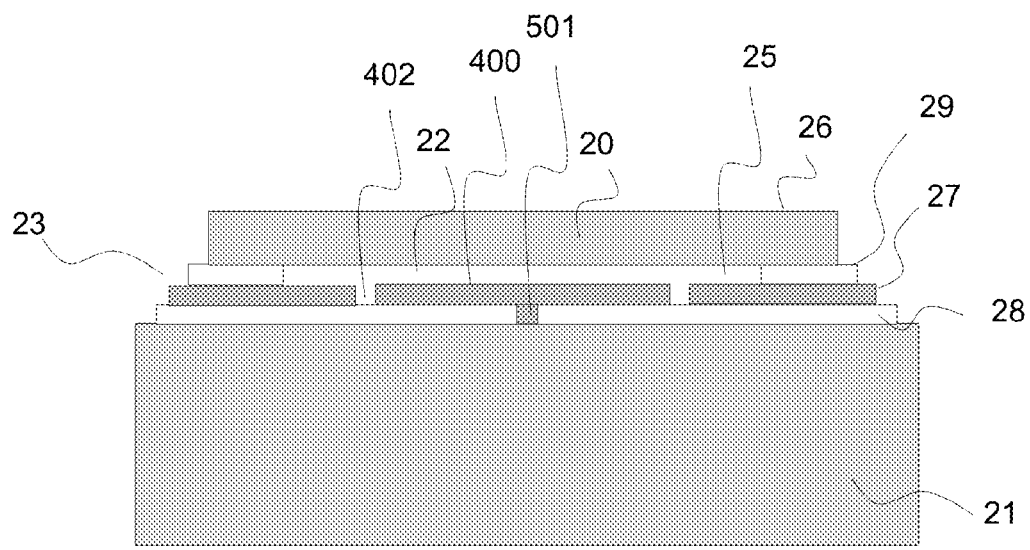
FIG. 5 illustrates a further embodiment of a microelectromechanical pressure sensor structure.

Advantageously, the internal electrode layer 400 has the same thickness as the shield layer 27 and is made of the same conductive material. In case the electrically isolating region is a trench, it may extend through the third layer only, as shown in FIG. 4, or through the third layer and the first layer, to the planar base. In either of the cases, the measured capacitance between the diaphragm 20 and the internal electrode layer 400 becomes serially coupled to the constant capacitance between the internal electrode layer 400 and the planar base 21. In some cases, this may cause additional complexity to the implementation. FIG. 5 illustrates a further embodiment where the electrode layer is adapted to be in electrical contact with the planar base 21 through a contact opening 501. Advantageously, the contact opening is small, i.e. in a cross section, the width of the internal electrode layer 400 is a multiple (at least ten times) of the width of the contact opening 501. Within the scope, it is also possible to use larger contact openings, but this tends to complicate manufacturing process of the side wall layers.

Freedom of selecting the thicknesses of the first and third layers 27, 28 and the possibility to increase thickness of the layer 29 render manufacturing of the side wall layers easier. Further, since the thicknesses of the dielectric layers 28 and 29 can be increased, the capacitances between the shield electrode 27 and the planar base 21 and the shield electrode 27 and the diaphragm plate 26 will be reduced. This decreases noise gain, and thereby the electrical noise by the closed loop amplifier circuit used with the shield electrode in the sensor structure.

A further disadvantage of the sensor structure of FIG. 1 is that the capacitance between the bending diaphragm 10 and the planar base 11 has a portion associated to the edge of the diaphragm 10, which is close to the support at side wall 13 and where the bending of the diaphragm due to applied pressure is insignificant.

The exemplary embodiments of FIGS. 2A and 2B (also applied in FIGS. 4 and 5) illustrate a way to arrange the layers of the side wall 23 further such that also this disadvantage is alleviated. In FIG. 2A, W2 denotes width of a diaphragm, meaning the part of the diaphragm plate 20 that substantially deflects in response to ambient pressure changes. W2 of FIG. 2A corresponds to a cross-sectional width of the diaphragm, i.e. a distance between opposite side walls of the second layer at two opposite points, in the top surface of the side walls where they connect to the diaphragm plate 20. W1 denotes the un-shielded width or capacitive width of the diaphragm. W1 of FIG. 2A corresponds to a corresponding cross-sectional width of the gap in the third layer, i.e. a distance between opposite inner peripheries of the circumferential third layer 27, determined from the same cross section of the sensor structure. When W2 is greater than W1, a part of the third layer 27 is between the bending diaphragm of the diaphragm plate 20 and the planar base 21. This means that capacitance of a part 25 of the diaphragm, where bending between the bending diaphragm 20 and the planar base 21 is quite minimal, is excluded from the measured sensor capacitance.

Figure 6:
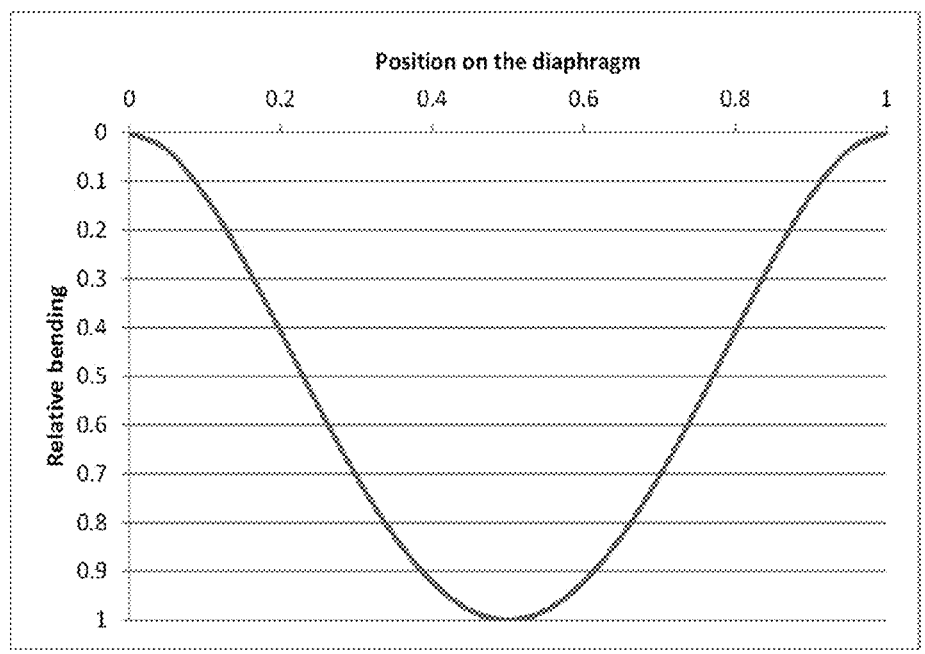
FIG. 6 shows relative bending of an exemplary diaphragm.
Figure 7:
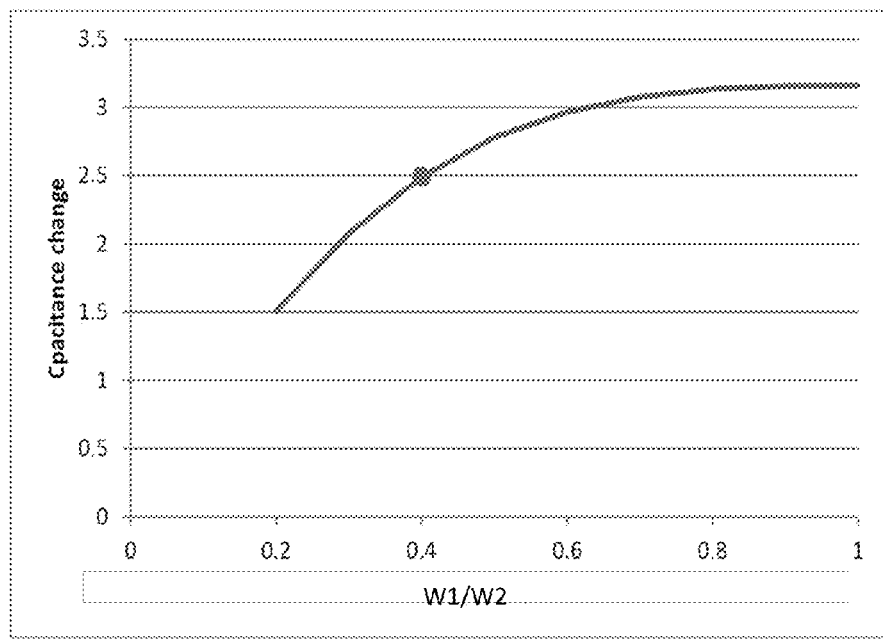
FIG. 7 illustrates variation of absolute capacitance change as a function of a dimensional ratio.
Figure 8:
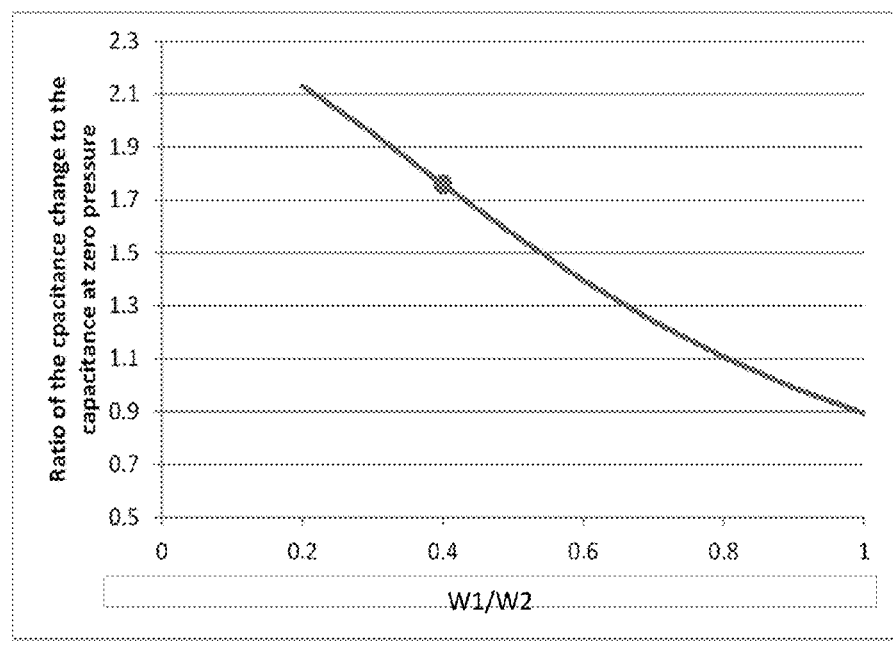
FIG. 8 illustrates a relative capacitance change as a function of the same dimensional ratio.
Figure 9:
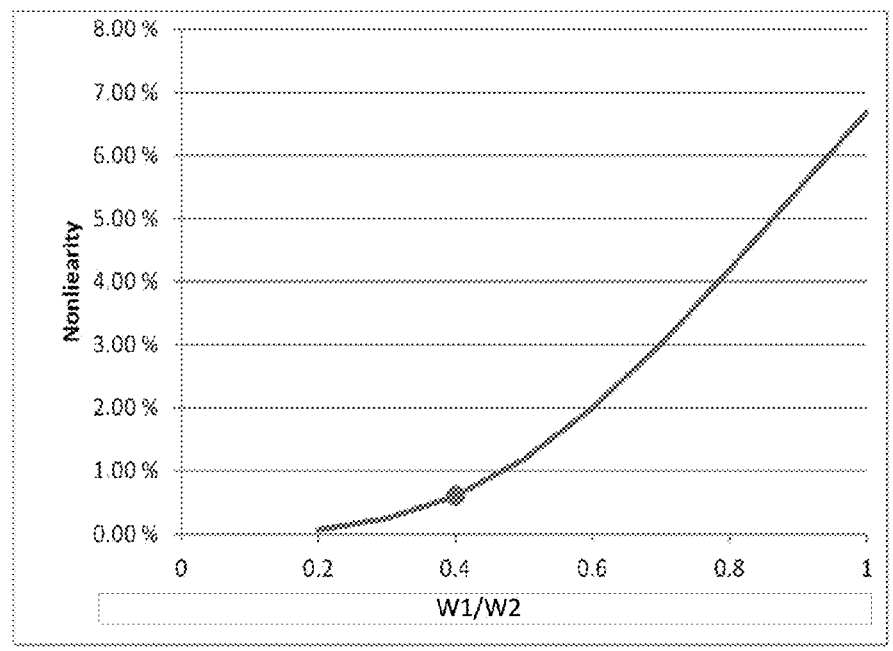
FIG. 9 illustrates non-linearity of 1/C characteristics as a function of the same dimensional ratio.

FIGS. 6 to 9 show results of simulations made with an exemplary test sensor structure, where the size of an oblong diaphragm is 0.2×1 mm, thickness of the diaphragm plate is 5 μm, and height of the gap (side walls) is 0.5 μm. FIG. 6 shows an example of relative bending along the width of a diaphragm that extends between opposite side walls. FIG. 7 illustrates the variation of absolute capacitance change as a function of the ratio $W_1/W_2$. FIG. 8 illustrates a relative capacitance change as a function of the ratio $W_1/W_2$. More specifically, FIG. 8 shows a change of a ratio between the capacitance change and the capacitance at zero pressure. FIG. 9 illustrates non-linearity of 1/C characteristics as a function of the ratio $W_1/W_2$.

Figure 10:
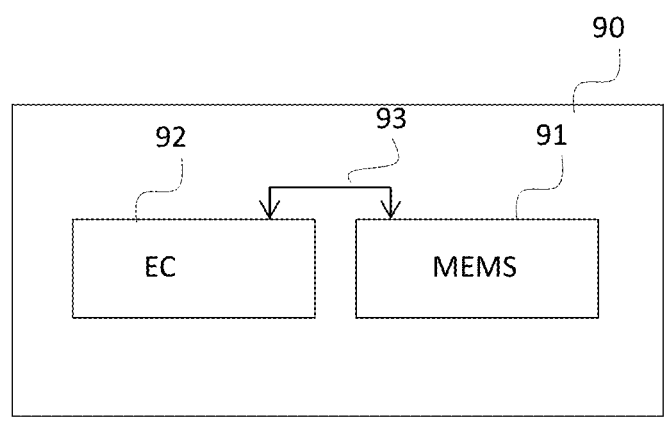
FIG. 10 illustrates a microelectromechanical pressure sensor that includes a microelectromechanical pressure sensor structure.

FIGS. 6 to 9 show that the portion of capacitance produced in areas near the edges has little added value to the absolute sensitivity (capacitance change per pressure), and has a detrimental effect to the relative sensitivity (capacitance change per capacitance at zero pressure per pressure) of the sensor. FIG. 6 shows that in parts of the diaphragm near the side walls, bending of the diaphragm is quite minimal. FIG. 7 shows that when $W_1/W_2=0.4$, the capacitance change is still about 80% (~2.5/3.2) of the maximum value at $W_1/W_2=1$. From FIG. 8 it may be seen that with the same ratio $W_1/W_2=0.4$, the relative capacitance change has improved by a factor of about 2 (~1.75/0.9). From FIG. 9 it may be seen that with the same ratio $W_1/W_2=0.4$, the non-linearity error has been reduced from more than 6% to 0.6%. Accordingly, by reducing the ratio $W_1/W_2$ to be smaller than one, the relative sensitivity and linearity can be improved controllably, without having to significantly compromise the absolute achievable capacitance change FIG. 10 illustrates an embodiment of a microelectromechanical pressure sensor 90 that includes the microelectromechanical pressure sensor structure 91. The pressure sensor also comprises an electrical circuit part 92. The sensor structure 91 and the electrical circuit part 92 may be separate dies. The electrical circuit part 92 may be connected by electrical leads 93 to the planar base, to the guard layer and to the diaphragm plate. The electrical circuit may also comprise an operational amplifier in a feed-back configuration connected to keep a shield electrode in a same potential with either of the planar base or the first planar layer, and keep the current paths through these terminals separated, as discussed with FIGS. 2A, 2B,4, 5 and FIGS. 3A to 3F.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A microelectromechanical pressure sensor structure, comprising:
   a planar base;
   a side wall layer; and
   a diaphragm plate, wherein
   the side wall layer forms side walls that extend away from the planar base into contact with the diaphragm plate,
   the side wall layer is formed of at least three layers, a first layer and a second layer of insulating material, and a third layer of conductive material,
   the third layer is between the first layer and the second layer,.
   the first layer extends horizontally towards the outer direction beyond the third layer, and the third layer extends horizontally towards the outer direction beyond the second layer, and
   in a cross-section, an outer periphery of the first insulating layer extends horizontally beyond an outer periphery of the third layer, and the outer periphery of the third layer extends horizontally beyond an outer periphery of the second insulating layer.

2. The microelectromechanical pressure sensor structure of claim 1, wherein in a cross section, a distance between opposite inner peripheries of the first layer is smaller than a distance between opposite inner peripheries of the third layer, and a distance between opposite inner peripheries of the third layer is smaller than a distance between opposite inner peripheries of the second layer.

3. The microelectromechanical pressure sensor structure of claim 1, wherein
   a portion of the diaphragm plate not in contact with the side wall layer provides a diaphragm, and wherein
   a ratio between a cross-sectional width of the gap in the third layer level and a corresponding cross-sectional width of the diaphragm is smaller than one.

4. The microelectromechanical pressure sensor structure of claim 3, wherein the ratio is in a range of 0.3 to 0.7.

5. The microelectromechanical pressure sensor structure of claim 4, wherein the ratio is 0.4.

6. The microelectromechanical pressure sensor structure of claim 1, wherein at least one of the first and the second layer comprises silicon-dioxide.

7. The microelectromechanical pressure sensor structure of claim 1, further comprising an internal electrode layer of conducting material within the side walls, wherein the internal electrode layer is electrically isolated from the third layer.

8. The microelectromechanical pressure sensor structure of claim 7, comprising an electrically isolating region circumscribing the internal electrode layer, thereby providing electrical isolation.

9. The microelectromechanical pressure sensor structure of claim 8, wherein the electrically isolating region comprises a trench that extends to the planar base through the internal electrode layer and the first layer.

10. The microelectromechanical pressure sensor structure of claim 8, wherein the internal electrode layer is in electrical contact with the planar base through a contact opening.

11. The microelectromechanical pressure sensor structure of claim 7, wherein the internal electrode layer is in electrical contact with the planar base through a contact opening.

12. A pressure sensor that comprises the microelectromechanical pressure sensor structure comprising:
   a planar base
   a side wall layer; and
   a diaphragm plate, wherein
   the side wall layer forms side walls that extend away from the planar base into contact with the diaphragm plate,
   the side wall layer is formed of at least three layers, a first layer and a second layer of insulating material, and a third layer of conductive material,
   the third layer is between the first layer and the second layer, and
   the first layer extends horizontally towards the outer direction beyond the third layer, and the third layer extends horizontally towards the outer direction beyond the second layer, the pressure sensor further comprising:
   an electrical circuit connected to electrical leads to the planar base, to a shield electrode and to the diaphragm plate, wherein the electrical circuit comprises an operational amplifier in a feed-back configuration connected to keep a. shield electrode in a same potential with either of the planar base or the diaphragm plate, and to separate a current path through the shield electrode and the diaphragm plate from each other.

13. The pressure sensor of claim 12, further comprising an electrical circuit connected to electrical leads to the planar base, to the layer of conducting material and to the diaphragm plate, wherein the electrical circuit comprises an operational amplifier in a feed-back configuration connected to keep the third layer of conducting material in a same potential with either of the planar base or the diaphragm plate, and to separate a current path through the shield electrode and a current path through diaphragm plate from each other.

14. The pressure sensor of claim 13, wherein the operational amplifier comprises an inverting operational amplifier or a non-inverting operational amplifier.

15. The pressure sensor of claim 12, wherein the operational amplifier comprises an inverting operational amplifier or a non-inverting operational amplifier.

16. The microelectromechanical pressure sensor structure of claim 12, wherein in a cross section, a distance between opposite inner peripheries of the first layer is smaller than a distance between opposite inner peripheries of the third layer, and a distance between opposite inner peripheries of the third layer is smaller than a distance between opposite inner peripheries of the second layer.

17. The pressure sensor of claim 12, further comprising an electrical circuit connected to electrical leads to the planar base, to the layer of conducting material and to the diaphragm plate, wherein the electrical circuit comprises an operational amplifier in a feed-back configuration connected to keep a layer of conducting material in a same potential with either of the planar base or the diaphragm plate, and to separate a current path through the shield electrode and a current path through diaphragm plate from each other.

* * * * *